United States Patent [19]

Fidi et al.

[11] 3,933,345

[45] Jan. 20, 1976

[54] ZIGZAG ARRANGEMENT OF HELICAL SPRINGS IN DEVICES FOR GENERATING ARTIFICIAL REVERBERATION

[75] Inventors: Werner Fidi, Baden; Otto Marschall, Vienna, both of Austria

[73] Assignee: AKG-Akustische und Kino Geräte GmbH, Austria

[22] Filed: Sept. 6, 1974

[21] Appl. No.: 503,690

[30] Foreign Application Priority Data

Sept. 12, 1973 Austria .............................. 7916/73

[52] U.S. Cl. .............................................. 267/168
[51] Int. Cl.²............................................ F16F 1/12
[58] Field of Search......... 267/168, 182; 72/19, 161

[56] References Cited

FOREIGN PATENTS OR APPLICATIONS 1,519,595 2/1968 France ............................... 267/168

*Primary Examiner*—James B. Marbert
*Attorney, Agent, or Firm*—McGlew and Tuttle

[57] ABSTRACT

Two consecutive portions of a single helical spring having a zig-zag arrangement are mutually interfitted with each other with their turns remaining out of contact, and with their taxes being in substantially tangential contact or, at the most, intersecting at an acute angle not in excess of 10 degrees. The ends of the two portions are firmly connected to each other directly at their deflection points, and the interconnection preferably is connected to one end of a soft spring whose opposite end is fixed to a rigid support. Consecutive helical spring portions may be wound in the same direction or in respective opposite directions.

8 Claims, 3 Drawing Figures

ZIGZAG ARRANGEMENT OF HELICAL SPRINGS IN DEVICES FOR GENERATING ARTIFICIAL REVERBERATION

FIELD AND BACKGROUND OF THE INVENTION

The present invention relates to a zigzag arrangement of helical springs in devices for generating artificial reverberation.

Helical springs are used as a reverberation generating means in the most varied devices, from studio equipments of highest quality to electronic musical instruments, music amplifiers or electoacoustic installations, for improving the acoustic properties of rooms. In comparison with other possibilities of generating reverberation, helical springs are advantageous primarily because of their small dimensions, simplicity and cheapness.

Usually, such springs are stretched in straight lines so that, even though occupying a small volume, they extend over extensive distances. To reduce the constructional lengths of reverberation devices, an angular arrangement of helical springs has been provided.

Such an arrangement is known, for example, from U.S. Pat. No. 3,363,202. This patent discloses two helical springs arranged at an acute angle and changing into a meander-shaped flat spring in the vertex area of the angle. The two end portions of the flat springs remote from the helical springs are united at their point of intersection. At this point of intersection, a small helical spring is attached which, at its other end, is suspended from an elastic support.

This arrangement has the substantial disadvantage that the flat, meander-shaped, elastic elements differ from the helical spring not only in their external appearance, i.e. their shape, but also in the polar moment of inertia, per turn, and the elasticity, per turn. In consequence, and junction of a helical spring and a meander-shaped element constitutes a point of dicontinuity for the oscillations passing through the device, which discontinuity produces reflections reducing the quality of the artificial reverberation generated in the device and, therefore, undesirable.

Since the moment of inertial is proportional to the third power of the diameter of the helical spring, there results the further requirement that any deflection of any form must be designed so as to be effective as near to the spring axis as possible, or directly in the spring axis, because, otherwise, a too large moment of inertia would be implicated and an unacceptably strong junction area would be formed. The criterion for the design of such angular arrangements is thereby given. The smaller the junction area, the more frequently and universally such deflections per spring may be provided.

Another drawback of the arrangement in accordance with U.S. Pat. No. 3,368,202 is that, due to the flat, elastic elements at the deflection points, the effective length of the helical springs is considerably shortened and a relatively large space is necessary for the deflection.

SUMMARY OF THE INVENTION

The invention relates to such an arrangement for helical springs of the type mentioned in the beginning in which the drawbacks of the prior art are eliminated and a smooth transmission at the angular connection is insured.

In accordance with the invention, this is obtained by providing that, in the deflection zone, two consecutive portions of a single helical spring have their turns mutually interfitted without contacting each other, and are arranged so that the axes of the spring portions are in tangential contact or, at most, intersect at a very acute angle ($\alpha$) and that the ends of the spring portions are firmly connected to each other directly at the deflection points.

According to another feature of the invention, in the deflection area, a portion of each of the last turns of the spring portions is bent toward the axial center and rigidly connected, at the deflection point, to a small, yielding spring the other end of which is fixed to a rigid holding support.

Advantageously, in accordance with another feature of the invention, the windings of consecutive spring portions may be of opposite directions, i.e. one of the spring portions may be right-hand wound and the other left-hand wound or inversely. A more close interfitting and more simple mounting of the helical spring portions is thereby made possible.

An object of the invention is to provide an improved zigzag arrangement of helical spring portions in devices for generating artificial reverberation.

Another object of the invention is to provide such a zigzag arrangement in which two consecutive helical spring portions have their turns mutually interfitted with each other while remaining out of contact.

A further object of the invention is to provide such a zigzag arrangement in which the axes of the two consecutive helical spring portions are in substantially tangential contact.

Yet another object of the invention is to provide such a zigzag arrangement in which the ends of the two consecutive helical spring portions are firmly interconnected at the deflection point.

For an understanding of the principles of the invention, reference is made to the following description of typical embodiments thereof as illustrated in the accompanying drawing.

DESCRIPTION OF THE PREFERRED EMBODIMENT

Figure 1:
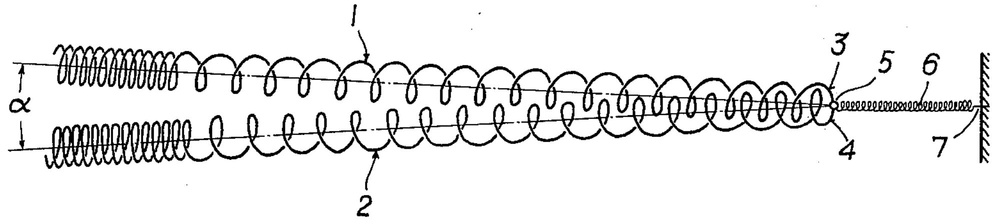
FIG. 1 is a general view of an angular interconnection of two consecutive helical spring portions in accordance with the invention.

In FIG. 1, two consecutive portions of a single helical spring generating the reverberation are designated 1 and 2. The longitudinal axes of the spring portions form an acute angle $\alpha$, which should not be larger than 10° to prevent noticeable quality losses. The ideal would be a tangential contact of the longitudinal axes of the two helical spring portions, which could be obtained by a corresponding bending of the same with the effect of practically avoiding a junction. However, in practice, it has been found that a bending necessary for a tangential contact of the spring axes would be useful only in cases where the deflection angle of the two spring portions cannot be made sufficiently acute. To avoid such a bending which, from the standpoint of manufacture, is not advantageous, the angle between the axes of the two helical spring portions should not exceed the mentioned value of 10° except for cases in which particular effects are desired which, however, have nothing to do with the aim of obtaining a reverberation as natural as possible.

As may also be seen in FIG. 1, in the zone of deflection, the two helical spring portions 1 and 2 have a larger pitch permitting a contact-free interfitting of their turns. The extremities 3 and 4 of the spring portions in the deflection area are bent inwardly toward the axis and joined to each other, which may be done by gluing, soldering, or welding. A small, yielding helical spring 6 has one end attached at point 5, the other end of which is, preferably, firmly connected to a rigid support 7. Spring 6 which, as compared to the two reverberation spring portions 1 and 2, has a substantially smaller diameter and is softer, serves only to permit the use of the reverberation device, equipped with the inventive arrangement, in any position. The system could also be operated without the spring 6, in suspended position with the deflection area below, which, however, would not be too practical. That is why it is preferred to use the slightly more expensive arrangement with the small spring 6 to obtain a system which is insensitive to shocks and operable in any position.

For the contact-free interfitting of the turns of the two reverberation spring portions in the zone adjacent the deflection, various geometrical solutions are possible, One of them is, for example, that the two spring portions are wound in the same direction and interconnected in a slightly offset position, the connection of the two spring portions being made at the intersection of the two longitudinal axes.

Another, more advantageous, solution is to use consecutive spring portions having opposing windings with the result of obtaining a smaller axial length of the two spring portions and facilitating the mounting.

It is also possible to provide the two portions of the spring, in the deflection zone, not only with an equal pitch but with a considerably larger pitch than in the rest of the zone, or to vary the pitch of the spring portions in the deflection zone in accordance with the requirements of the mounting.

There are certainly still other possibilities for obtaining a contact-free interfitting of the turns of the consecutive reverberation spring portions in the deflection zone. However, there may be considered only such arrangements in which the joint of the two spring portions is located at the point of intersection of the two axes and the two spring portions form an angle as acute as possible or are connected tangentially.

Figure 2:
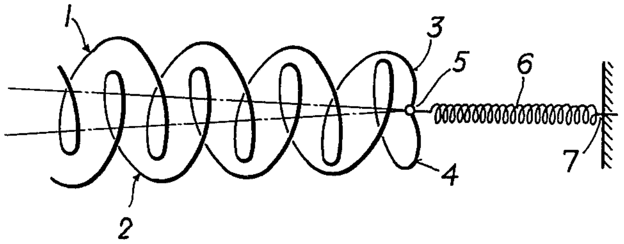
FIG. 2 is enlarged view illustrating the invention with the two consecutive spring portions wound in respective opposite directions.
Figure 3:
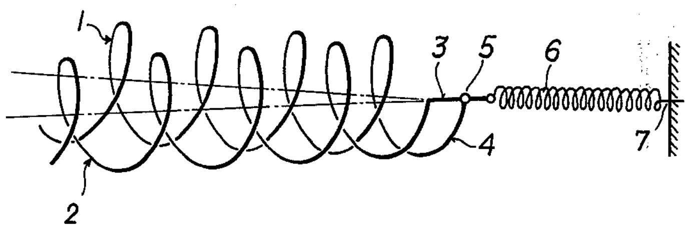
FIG. 3 is a view similar to FIG. 2, but illustrating the two consecutive spring portions as wound in the same direction.

As to the possible solutions in which two consecutive reverberation spring portions are joined to each other at an acute angle, two of them are shown in FIG. 2 and 3. FIG. 2 shows the immediate vicinity of the deflection point where two consecutive reverberation spring portions 1 and 2, having opposing windings, are used. To reduce the amount of inertia at the deflection point as much as possible, end portions 3, 4 of the last turn are bent toward the center and connected to each other at the point of intersection 5 of the two longitudinal axes by soldering, welding, or gluing.

FIG. 3 shows a possible solution for spring portions wound in the same direction. The small suspension spring 6 may be attached directly at the point of intersection 5, as shown in FIG. 2, or, according to FIG. 3, at a point which is somewhat offset, which is obtained by bending one of the spring end portions (in FIG. 3 the portion 3) outwardly in the direction of the angle bisector. Small spring 6 is fixed to this short intermediate portion.

The arrangement in accordance with the invention largely simplifies the mounting as compared to the known arrangements of the same type and results in a practically reflection-free angular connection of the reverberation springs, provided that the angle $\alpha$ formed by the two axes is made as small as possible. Therefore, the invention may also be applied in arrangements where more than one deflection is provided without causing a noticeable loss in the quality of the artificially generated reverberation. The interfitting of the turns of the two consecutive spring portions in the vicinity of the deflection point also results in a substantially more compact construction as compared to the prior art.

While specific embodiments of the invention have been shown and described in detail to illustrate the application of the principles of the invention, it will be understood that the invention may be embodied otherwise without departing from such principles.

What is claimed is:

1. In a zigzag arrangement of helical springs, in devices for generating artificial reverberation, the improvement comprising, in combination, two consecutive portions of a single helical spring having their helical turns mutually interfitted with each other while remaining out of contact, and with their axes in substantially tangential contact; and means firmly interconnecting adjacent ends of said two consecutive helical spring portions to each other directly at the deflection point of the two consecutive helical spring portions.

2. In a zigzag arrangement of helical springs, the improvement claimed in claim 1, in which the axes of said two consecutive helical spring portions intersect each other at a very small acute angle.

3. In a zigzag arrangement of helical springs, the improvement claimed in claim 2, in wich said acute angle is not in excess of 10°.

4. In a zigzag arrangement of helical springs, the improvement claimed in claim 1, in which, in the deflection area of the two consecutive helical spring portions, a portion of the last turn of each spring portion is bent toward the axis of the associated spring portion, the two bent portions being interconnected substantially at the deflection point of the two consecutive spring portions; and a soft spring having one end connected to the interconnected ends of the two spring portions and the other end connected to a rigid support, said soft spring being relatively small as compared to the two consecutive reverberation generating spring portions.

5. In a zigzag arrangement of helical springs, the improvement claimed in claim 4, in which the interconnection point of the two spring portions and the soft spring is at the deflection point of the two consecutive helical spring portions.

6. In a zigzag arrangement of helical springs, the improvement claimed in claim 1, in which said two consecutive helical spring portions are wound in the same direction.

7. In a zigzag arrangement of helical springs, the improvement claimed in claim 6, in which the last turn of one spring portion is bent to extend substantially axially to the last turn of the other spring portion for connection thereto.

8. In a zigzag arrangement of helical springs, the improvement claimed in claim 1, wherein consecutive helical spring portions are wound in respective mutually opposite directions.

* * * * *